United States Patent [19]

Busch et al.

[11] 4,434,044
[45] Feb. 28, 1984

[54] METHOD FOR RECOVERING SULFUR OXIDES FROM CO-RICH FLUE GAS

[75] Inventors: Lloyd E. Busch; Paul W. Walters; Oliver J. Zandona, all of Ashland, Ky.

[73] Assignee: Ashland Oil, Inc., Ashland, Ky.

[21] Appl. No.: 304,992

[22] PCT Filed: May 13, 1981

[86] PCT No.: PCT/US81/00648
§ 371 Date: Sep. 1, 1981
§ 102(e) Date: Sep. 1, 1981

[87] PCT Pub. No.: WO82/04062
PCT Pub. Date: Nov. 25, 1982

[51] Int. Cl.³ .................. C10G 25/00; B01D 53/34
[52] U.S. Cl. .................................... 208/91; 208/86; 423/210; 423/244; 502/38
[58] Field of Search .................. 423/210, 244; 252/411 S; 208/86, 91, 93, 126, 127, 55

[56] References Cited

U.S. PATENT DOCUMENTS

| | | | |
|---|---|---|---|
| 2,455,419 | 12/1948 | Johnson | 252/411 S |
| 3,699,037 | 10/1972 | Annesser et al. | 423/244 A |
| 4,177,158 | 12/1979 | Blue | 423/244 A |
| 4,263,128 | 4/1981 | Bartholic | 208/93 X |

Primary Examiner—Earl C. Thomas
Attorney, Agent, or Firm—Richard C. Willson, Jr.; Carl D. Farnsworth

[57] ABSTRACT

A combination process is described for upgrading residual oils and high boiling portions thereof comprising metal contaminants and high boiling Conradson carbon forming compounds comprising a thermal visbreaking operation with fluidizable inert solids followed by a fluidized zeolite catalytic cracking operation processing demetallized products of the visbreaking operation, regenerating solid particulate of each operation under conditions to provide CO rich flue gases relied upon to generate steam used in each of the fluidized solids conversion operation and downstream product separation arrangements, separating the wet gas product stream of each operation in a common product recovery arrangement and processing the high boiling feed product of visbreaking comprising up to 100 ppm Ni +V metal contaminant over a recycled crystalline zeolite cracking catalyst distributed in a sorbent matrix material comprising a high level of Ni +V metal contaminant.

9 Claims, 7 Drawing Figures

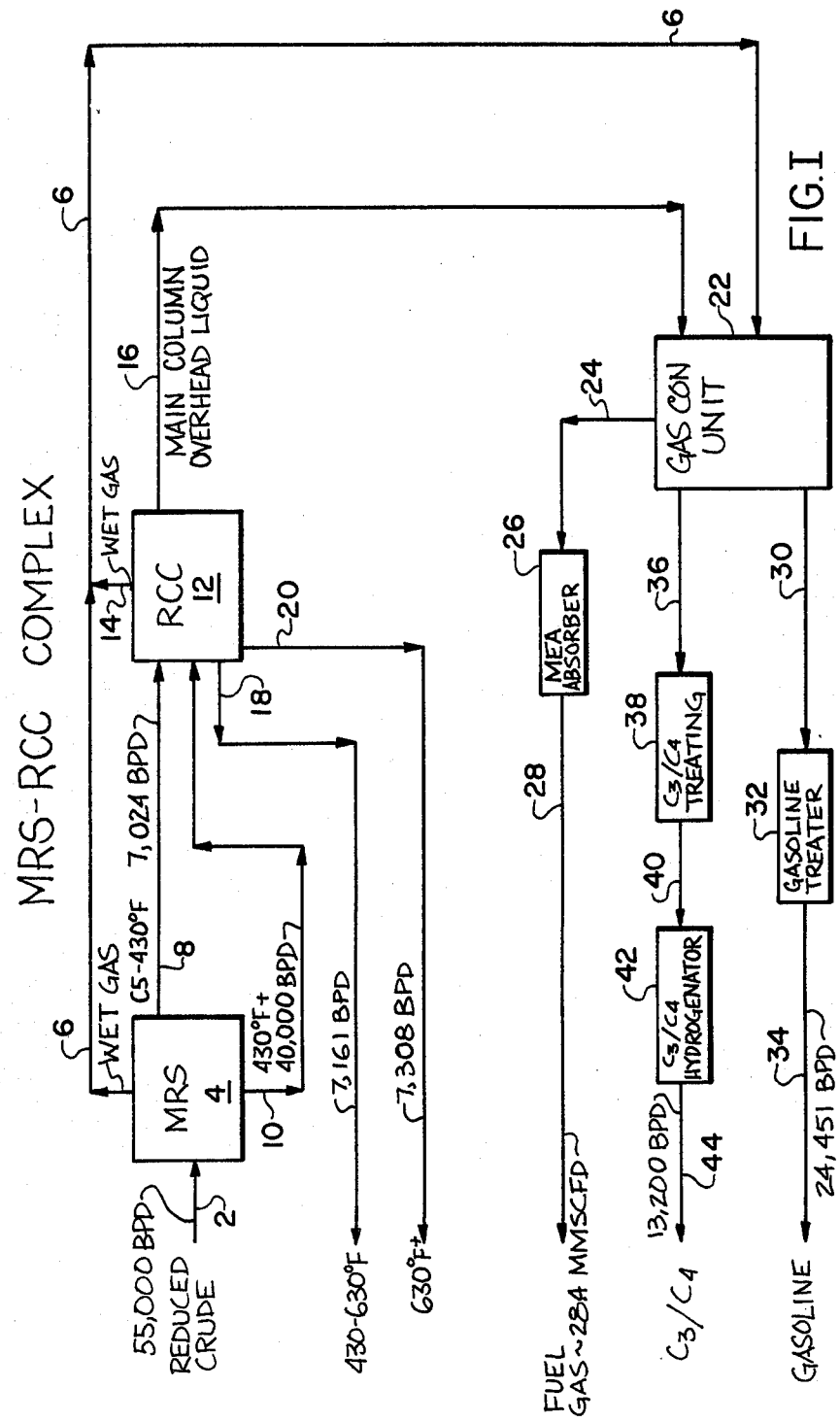

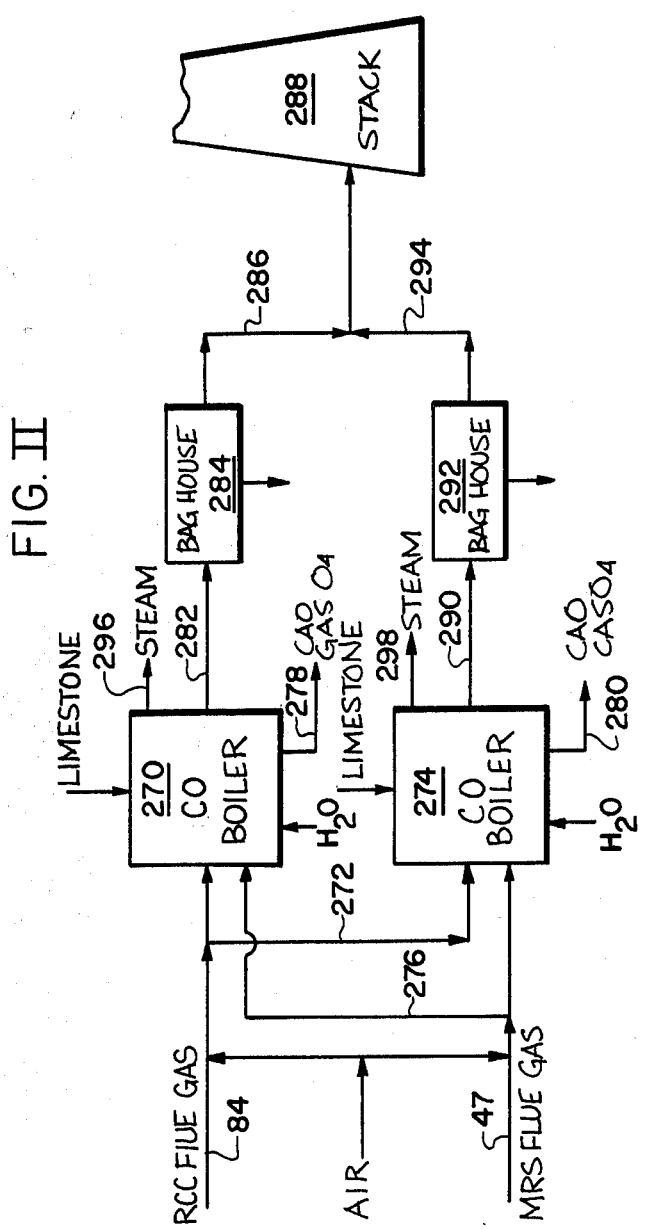
FIG. II

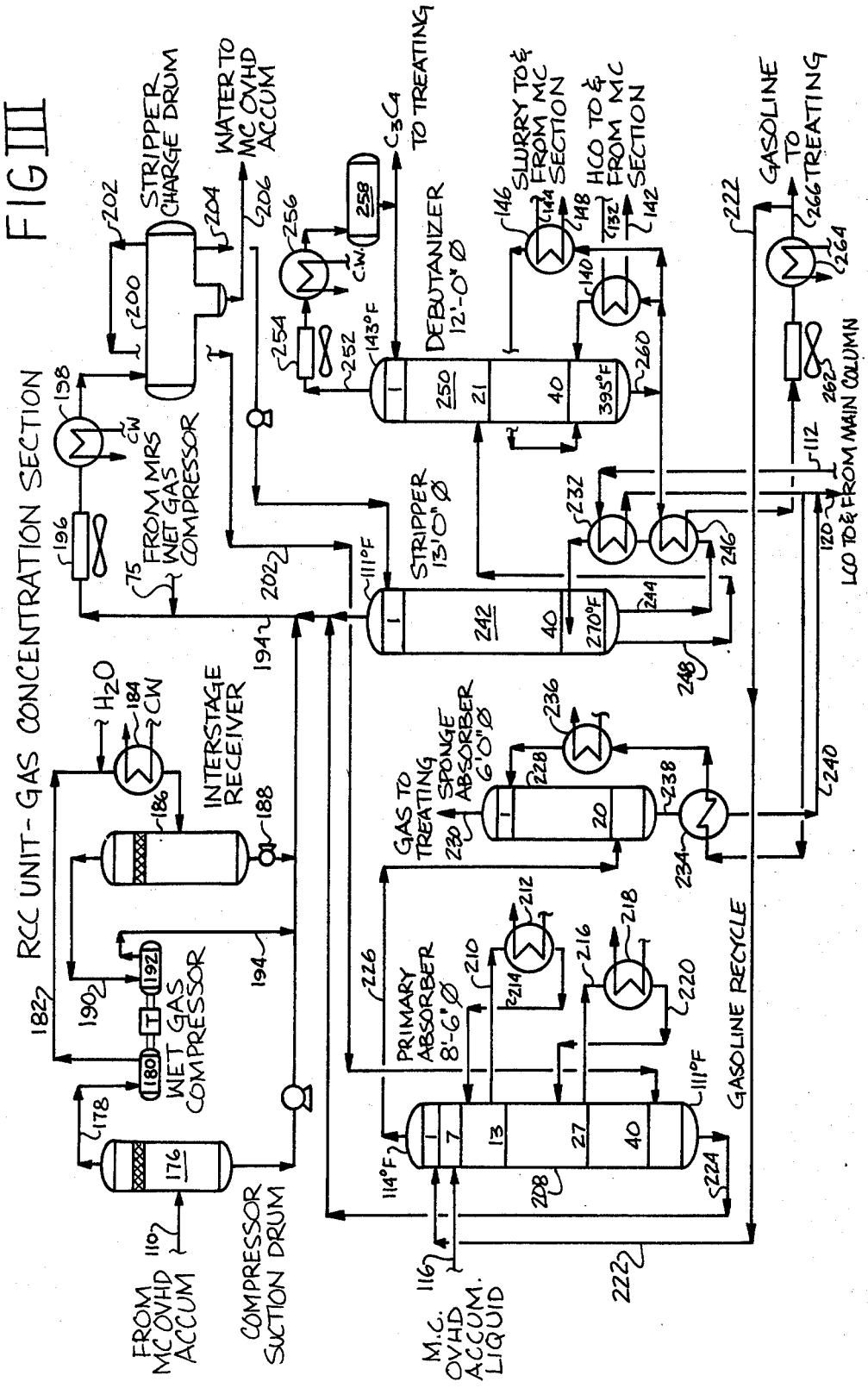

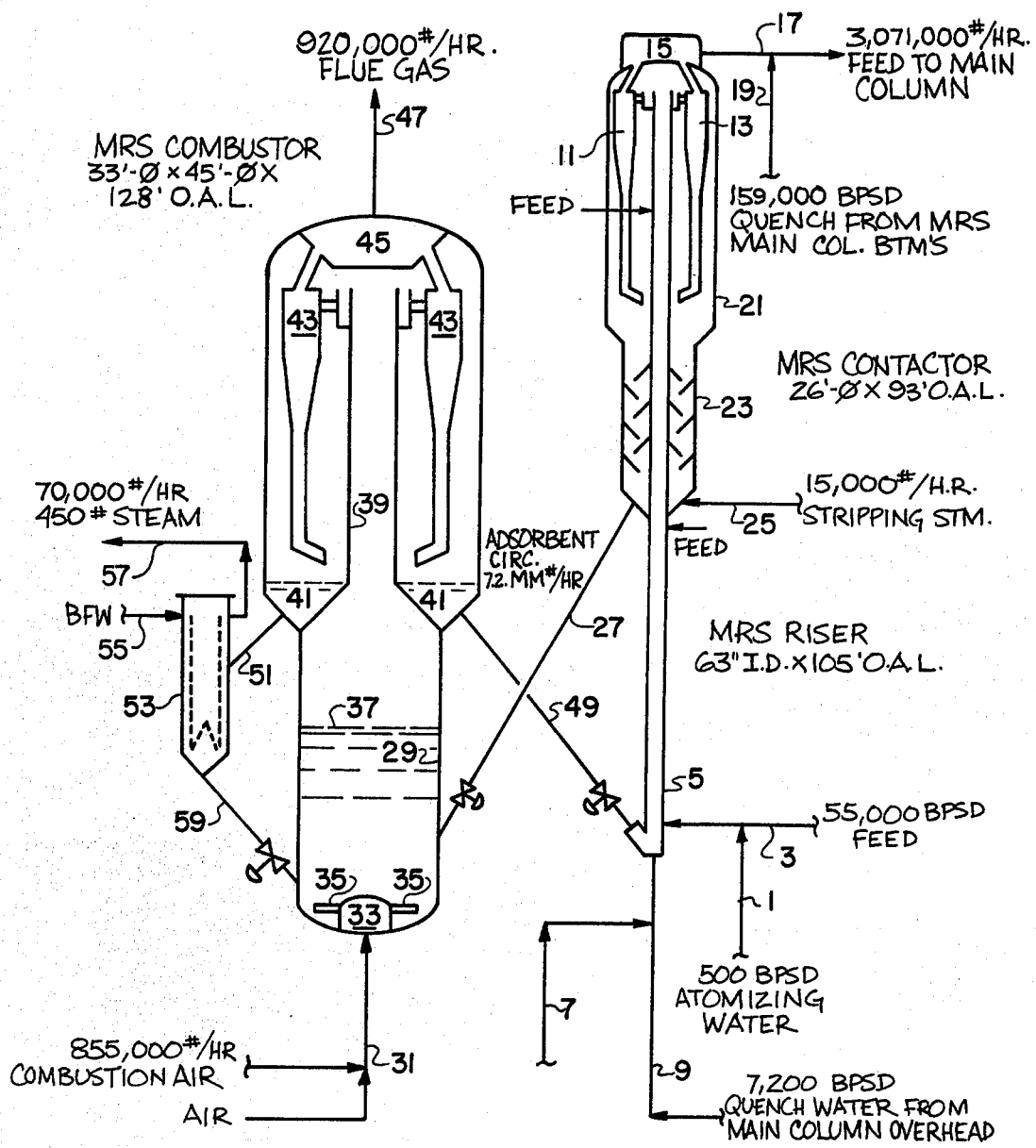
FIG. IV

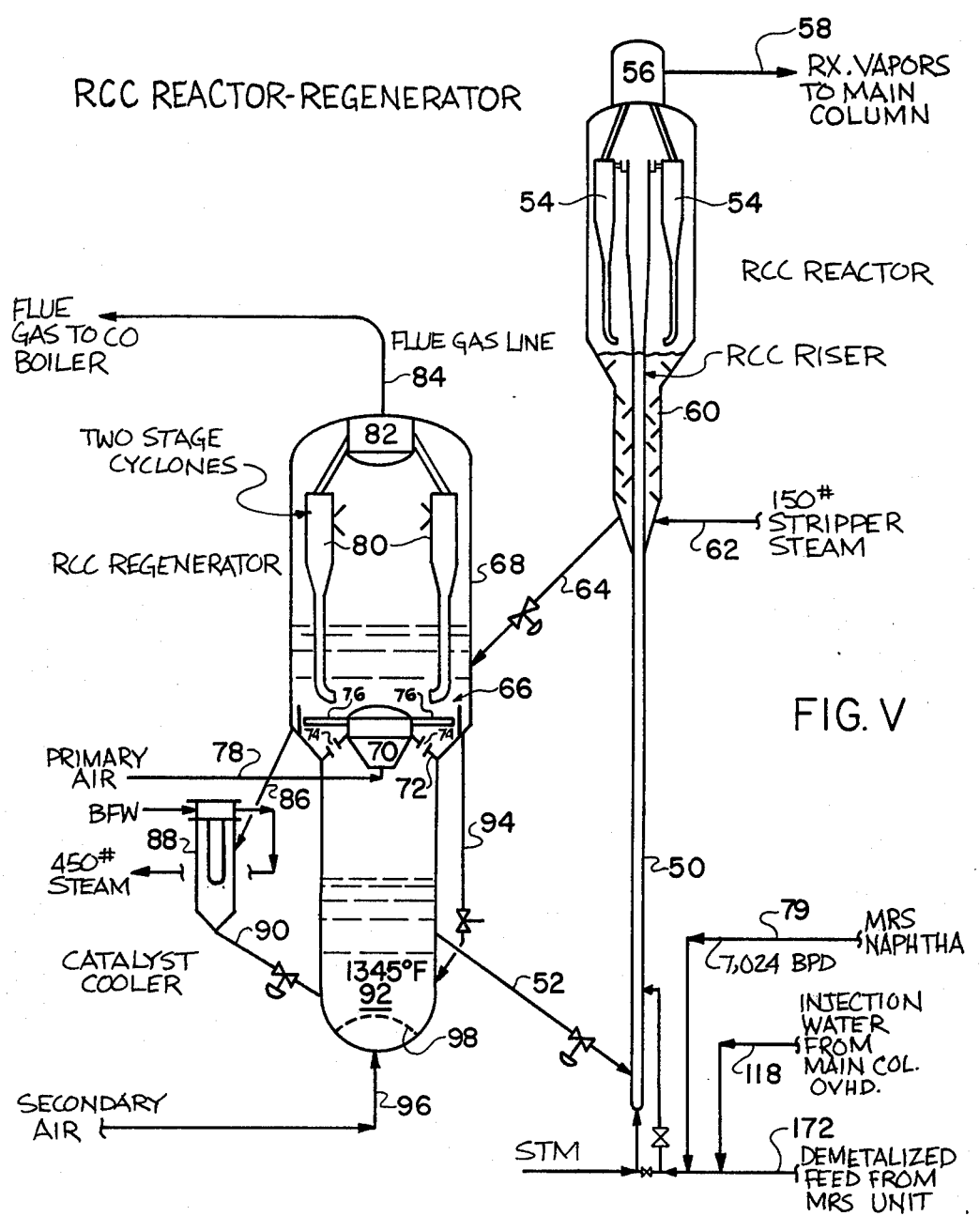
FIG. V

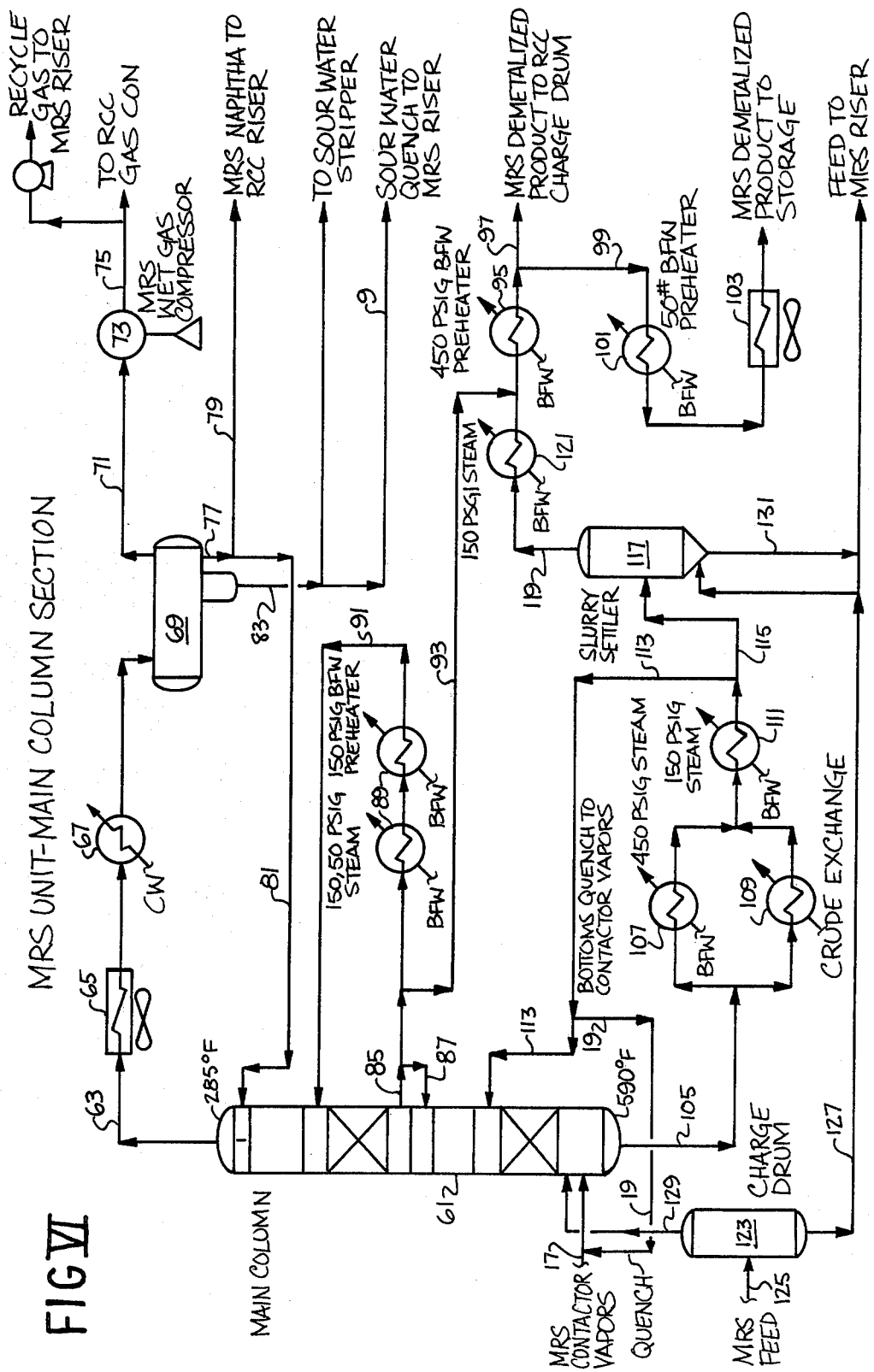

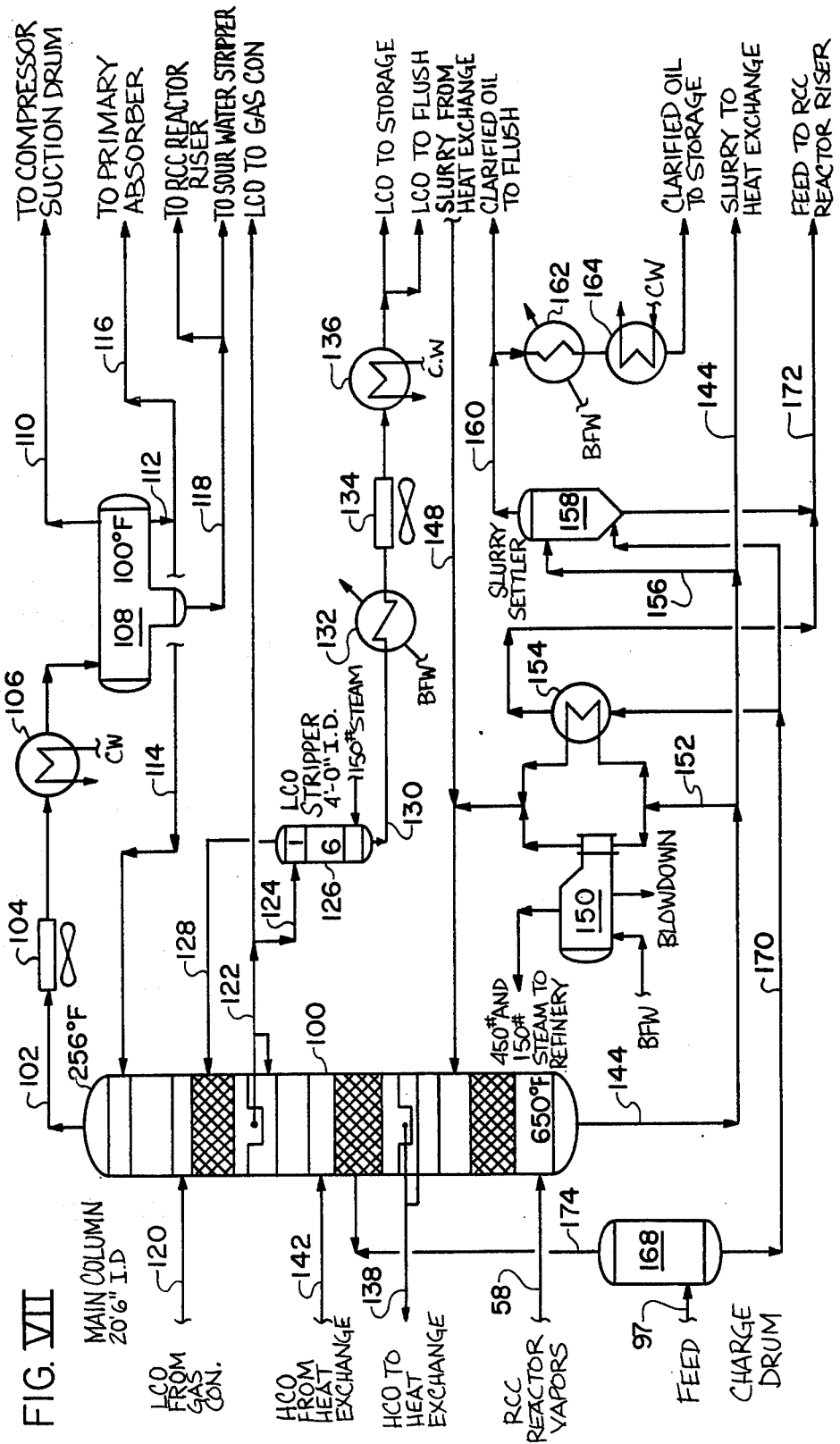
FIG. VII  RCC UNIT— MAIN COLUMN SECTION

# METHOD FOR RECOVERING SULFUR OXIDES FROM CO-RICH FLUE GAS

BACKGROUND OF THE INVENTION

Crude oil from which desired gaseous and liquid fuels are made contain a diverse mixture of hydrocarbons and other compounds which vary widely in molecular weight and therefore boil over a wide range. For example, crude oils are known in which 30 to 60% or more of the total volume of oil is composed of compounds boiling at temperatures above 650° F. Among these are crudes in which about 10% to about 30% or more of the total volume consists of compounds so heavy in molecular weight that they boil above 1025° F. or at least will not boil below 1025° F. at atmospheric pressure.

Because these high boiling components of crude oil boiling above 650° F. are unsuitable for inclusion in gasoline and some higher boiling liquid hydrocarbon fuels, the petroleum refining industry has developed processes for separating and/or breaking the molecules of the high molecular weight, high boiling compounds into smaller molecules which do boil over an appropriate boiling range. The cracking process which is most widely used for this purpose is known as fluid catalytic cracking (FCC). Although the FCC process has reached a highly advanced state, and many modified forms and variations have been developed, their unifying factor is that a restricted boiling range hydrocarbon feedstock is caused to be cracked at an elevated temperature in contact with a cracking catalyst that is suspended in the feedstock under cracking conditions in a temperature range of 950° to 1100° F. Upon attainment of a desired degree of molecular weight and boiling point reduction the catalyst is separated from the desired catalytic conversion products.

Crude oils in the natural state contain a variety of materials which tend to have quite troublesome effects on FCC processes, and only a portion of these troublesome materials can be economically removed from the crude oil. Among these troublesome materials are coke precursors (such as asphaltenes, polynuclear aromatics, etc.), heavy metals (such as nickel, vanadium, iron, copper etc.), lighter metals (such as sodium, potassium, etc.), sulfur, nitrogen and others. Certain of these, such as the lighter metals, can be economically removed by desalting operations, which are part of the normal procedure for pretreating crude oil for fluid catalytic cracking. Other materials, such as coke precursors, asphaltenes and the like, tend to break down into coke during the cracking operation, which coke deposits on the catalyst, impairing contact between the hydrocarbon feedstock and the catalyst, and generally reducing its potency or activity level. The heavy metals transfer almost quantitatively from the feedstock to the catalyst surface.

If the catalyst is reused again and again for processing additional feedstock, which is usually the case, heavy metals in the feedstock can accumulate on the catalyst to the point that they unfavorably alter the composition of the catalyst and/or the nature of its effect upon the feedstock. For example, vanadium tends to form fluxes with certain components of commonly used FCC catalysts, lowering the melting point of portions of the catalyst particles sufficiently so that they begin to sinter and become ineffective cracking catalysts. Accumulations of vanadium and other heavy materials, especially nickel, also "poison" the catalyst. They tend in varying degrees to promote excessive dehydrogenation and aromatic condensation, resulting in excessive production of carbon and gases with consequent impairment of liquid fuel yield. An oil such as a crude or crude fraction or other oil that is particularly abundant in nickel and/or other metals exhibiting similar behavior, while containing relatively large quantities of coke precursors, is referred to herein as a carbo-metallic oil, and represents a particular challenge to the petroleum refiner.

There has been a long standing interest in the conversion of carbo-metallic oils into gasoline and other liquid fuels. For example, in the 1950's it was suggested that a variety of carbo-metallic oils could be successfully converted to gasoline and other products in the Houdresid process. The Houdresid process employed catalyst particles of "granular size" (much larger than conventional FCC catalyst particle size) in a compact gravitating bed, rather than suspending catalyst particles in feed and product vapors in a fluidized bed. The productivity of the process, compared to fluid catalytic cracking with lighter gas oils, was low. But the Houdresid process did offer some advantages. It appeared that the adverse effects previously encountered with heavy metals in the feed were not as great a barrier in the Houdresid process as one might expect in FCC processing. The heavy metal which accumulated on or near the outer surfaces of the catalyst particles apparently could be removed to some extent by an attrition process, which selectively removed an outer layer of metal-contaminated catalyst. The catalysts were very cheap, but also relatively inactive, highly unsuitable by today's standards. While the maximum tolerable limit of heavy metal contamination on catalyst in fluid catalytic cracking was then thought to be about 200 parts per million, the Houdresid process did continue to operate satisfactorily even when the total nickel plus vanadium content of the catalyst had reached 870 ppm. Moreover, it was found that the required levels of selectivity could be maintained without withdrawing catalyst from the process, except to the extent that withdrawal was required by normal mechanical losses (e.g. attrition and inadvertent discharge with off gases) and by the attrition used to control metals level. Today such attrition of catalyst to fine particulates would present an expensive environmental problem, thus considerably increasing difficulties involved in practicing the process.

Although the Houdresid process obviously represented a step forward in dealing with the effects of metal contamination and coke formation on catalyst performance, its productivity was limited. Thus, for the 25 years which have passed since the Houdresid process was first introduced commercially, the art has continued its arduous search for suitable modifications or alternatives to the FCC process which would permit commercially successful operation on reduced crude and the like. During this period a number of proposals have been made; some have been used commercially to a certain extent.

Several proposals involve treating a heavy oil feed to remove the metal therefrom prior to cracking, such as by hydrotreating, solvent extraction and complexing with Friedel-Crafts catalysts, but these techniques have been criticized as unjustified economically. Another proposal employs a combination cracking process having "dirty oil" and "clean oil" units. Still another proposal blends residual oil with gas oil and controls the quantity of residual oil in the mixture in relation to the equilibrium flash vaporization temperature at the bottom of the riser type cracker unit employed in the process. Still another proposal subjects the feed to a mild preliminary hydrocracking or hydrotreating operation before it is introduced into the cracking unit. It has also been suggested to contact a carbo-metallic oil such as reduced crude with hot taconite pellets to produce gasoline. This is a small sampling of the many proposals which have appeared in the patent literature and technical reports.

Notwithstanding the great effort which has been expended and the fact that each of these proposals overcomes some of the difficulties involved, conventional FCC practice today bears mute testimony to the dearth of carbo-metallic oil-cracking techniques that are both economical and highly practical in terms of technical-feasibility. Some crude oils are relatively free of coke precursors or heavy metals or both, and the troublesome components of crude oil are for the most part concentrated in the highest boiling fractions. Accordingly, it has been possible to largely avoid the problems of coke precursors and heavy metals by sacrificing the liquid fuel yield which would be potentially available from the highest boiling fractions. More particularly, conventional FCC practice has employed as a part of the gas oil feedstock that fraction of crude oil which boils at about 650° F. to about 1000° F., such fractions being relatively free of heavy metal contamination. Such feedstock, known as "vacuum gas oil" (VGO) is generally prepared from crude oil by distilling off the fractions boiling below about 650° F. at atmospheric pressure and then separating by further vacuum distillation from the heavier fractions a cut boiling between about 650° F. and about 900° F. to 1025° F.

A gas oil of atmospheric distillation in combination with vacuum gas oil is used as feedstock for conventional FCC processing. The heavier fractions of the crude oil are normally employed for a variety of other purposes, such as for instance production of asphalt, residual fuel oil, #6 fuel oil, or marine Bunker C fuel oil, which represents a great waste of the potential value of this portion of the crude oil, especially in light of the great effort and expense which the art has been willing to expend in the attempt to produce generally similar materials from coal and shale oils.

The present invention is aimed at the cracking of gas oils and heavier fractions of crude oils containing substantial quantities of both coke precursors, heavy metals, and other troublesome components either alone or in conjunction with the lighter oils, thereby increasing the overall yield of gasoline and other desired liquid fuels from a given crude oil. It is believed that the process of this invention is uniquely advantageous for dealing with the problem of treating high boiling carbo-metallic oils in an economically and technically sound manner.

In general the coke-forming tendency or coke precursor content of an oil can be ascertained by determining the weight percent of carbon remaining after a sample of that oil has been pyrolized. The industry accepts this value as a measure of the extent to which a given oil tends to form non-catalytic coke when employed as feedstock in a catalytic cracker. Two established tests are recognized, the Conradson Carbon and Ramsbottom Carbon tests, the latter being described in ASTM Test No. D524-76. In conventional FCC practice, Ramsbottom carbon values on the order of about 0.1 to about 1.0 are regarded as indicative of acceptable feed.

The present invention is concerned with the use of hydrocarbon feedstocks which have higher Ramsbottom carbon values and thus exhibit substantially greater potential for coke formation than the usual feeds.

Since the various heavy metals are not of equal catalyst poisoning activity, it is convenient to express the poisoning activity of an oil containing a given poisioning metal or metals in terms of the amount of a single metal which is estimated to have equivalent poisoning activity. Thus, the heavy metals content of an oil can be expressed by the following formula (patterned after that of W. L. Nelson in *Oil and Gas Journal*, page 143, Oct. 23, 1961) in which the content of each metal present is expressed in parts per million of such metal, as metal, on a weight basis, based on the weight of feed:

$$\text{Nickel Equivalents} = \text{Ni} + \frac{V}{4.8} + \frac{Fe}{7.1} + \frac{Cu}{1.23}$$

According to conventional FCC practice, the heavy metal content of feedstock for FCC processing is controlled at a relatively low level, e.g. about 0.25 ppm Nickel Equivalents or less. The present invention is concerned with the processing of feedstocks containing metals substantially in excess of this value, and which therefore have a significantly greater potential for accumulating on and poisoning catalyst.

The above formula can also be employed as a measure of the accumulation of heavy metals on cracking catalyst, except that the quantity of metal employed in the formula is based on the weight of catalyst (moisture free basis) instead of the weight of feed. In conventional FCC practice, in which a circulating inventory of catalyst is used again and again in the processing of fresh feed, with periodic or continuing minor addition and withdrawal of fresh and spent catalyst, the metal content of the catalyst is maintained at a level which may for example be in the range of about 200 to about 600 ppm Nickel Equivalents. The process of the present invention is concerned with the use of catalyst having a substantially larger metals content, and which therefore has a much greater than normal tendency to promote dehydrogenation, aromatic condensation, gas production or coke formation. Therefore, such higher metals accumulation is normally regarded as quite undesirable in FCC processing.

SUMMARY OF THE INVENTION

The present invention is concerned with the conversion of the higher boiling portions of crude oils known as residual oils and/or resids recovered from as the bottoms product of atmospheric and/or vacuum distillation and containing substantial quantities of coke precursors and heavy metal contaminants, sulfur and nitrogen compounds. Sodium found in crude oil is also a troublesome component in deactivating a cracking catalyst. Thus the combination process of this invention is a unique sequence of operations designed to dispose of and/or handle the undesirable components of reduced crudes in a manner permitting conversion of high boiling hydrocarbon components in association therewith to more desirable gaseous and liquid fuel products.

The combination of unique steps contributing to the novel processing combination of this invention represents a highly productive approach to the conversion and recovery of product of conversion of high boiling crude oil feedstocks comprising carbo-metallic feed components such as found in topped crudes, residual oils, reduced crudes and resids. A petroleum crude oil and particularly the 650° F. plus portion thereof is characterized in the absence of further treatment as having a heavy metals content of at least about 5 ppm of Ni equivalents by weight and a carbon residue on pyrolysis of at least about 1% by weight.

Some hydrocarbon feeds which may be processed in the combination operation of this invention are specifically identified in Table 1 below.

dizable inert solids for effecting initial contact of a reduced crude containing feed as herein identified with a solid sorbent material to effect removal of metal contaminants and thermal degradation of high boiling carbon forming materials in the feed. In this fluid solids thermal conversion system (MRS) effected at a temperature within the range of 900° to 1050° F. it is desirable to employ a riser contacting zone which permits maintaining the hydrocarbon feed residence time below

TABLE 1

| Oil or Crude | API Grav. 650+[2] Total | Volume % of 650+ Fraction Boiling at 650– 1025 | Volume % of 650+ Fraction Boiling at 1025+ | Ramsbottom Carbon Content 650– 1025 | Ramsbottom Carbon Content 1025+ | Wt. ppm Metals[3] Ni | Wt. ppm Metals[3] V | Wt. ppm Metals[3] Fe | Ni Equiv. | Wt.% S in 650+ Total | Weight of Nitrogen (ppm) 650+ Fraction Total | Weight of Nitrogen (ppm) 650+ Fraction Basic | Wt. ppm Na |
|---|---|---|---|---|---|---|---|---|---|---|---|---|---|
| VGO | 28.4 | 100 | 0.0 | 0.38 | 0.38 | 0.2 | 0.1 | 2.6 | .059 | .83 | 722 | 260 | 0.8 |
| Mexican Isthmus | 16.9 (21.3) | 65.3 | 34.7 | 0.49 | 4.96 | 2.5+ | 33.8 | 1.9 | 9.81 | 2.75 | 950 | 450 | 6.9 |
| Mexican Kurkuk[1] | 17.4 | | | | 9.30 | 35.0 | 99.0 | 17.0 | 50.02 | 2.94 | 2100 | 723 | 1.8 |
| Murban | 23.1 | 78.7 | 21.3 | 0.49 | 3.99 | 3.0+ | 1.5 | 11.9 | 4.99 | 1.64 | 512 | 200 | 7.5 |
| Arabian Light | 19.1 | 64.7 | 35.3 | 0.47 | 6.56 | 6.4 | 24.7 | 3.2 | 12.00 | 2.39 | 940 | 507 | 9.2 |
| Arabian Med. | 14.5 | 51.8 | 48.2 | 0.46 | 9.00 | 19.6 | 63.0 | 2.9 | 33.13 | 4.43 | | | |
| Ekofisk | 22.7 | 72.8 | 27.2 | 0.36 | 4.42 | 1.4 | 3.0 | 2.4 | 2.36 | 0.38 | | | |
| Fosterton | 10.9 | 43.6 | 56.4 | 0.42 | 16.81 | 48.8 | 119.0 | 3.1 | 74.03 | 4.22 | | | |
| Iranian Light | 17.4 | 60.8 | 39.2 | 0.48 | 9.01 | 21.9 | 60.0 | 3.1 | 34.84 | 2.50[4] | | | |
| La./Miss Sweet | 23.7 | 80.2 | 19.8 | 0.33 | 4.36 | 2.7+ | — | 8.5 | 3.90 | 0.26 | | | |
| Wyoming Sour | 12.4 | 40.7 | 59.3 | 0.32 | 15.1 | 0.6 | 70.0 | 2.0 | 15.47 | 3.84 | | | |

[1]A refinery blend of Mexican and Kirkuk crudes.
[2]Throughout the table 650 and 1025 refer to 650°F. and 1025°F. respectively; 650+ refers to 650°F.+ material as defined below.
[3]Copper level was below 0.5%, except that Mexican Kirkuk contained 0.06%; all metals expressed as metal in ppm, based on the weight of the 650+ fraction.
[4]Calculated.

BRIEF DESCRIPTION OF THE DRAWINGS

FIG. I is a block flow arrangement of an integrated combination of processing steps for upgrading the higher boiling portions of crude oil known as resids, residual oils, and reduced crudes comprising metal contaminants and relatively high Conradson carbon producing materials. More particularly the combination of processing steps generally represented by FIG. I comprise a metals-carbon removal contact step with a relatively inert solids sorbent material followed by a more severe catalytic conversion operation designed and operated to produce gasoline and lower boiling hydrocarbons as well as upgraded higher boiling liquid products more suitable for further conversion to liquid and gaseous fuel products. A still higher activity fluid catalytic cracking catalyst substantially completely free of metal contaminants may be used in a further separate cracking zone if desired to convert the upgraded higher boiling liquid products. The integrated combination operation of FIG. I is a heat balanced energy efficient operation which utilizes a combination of fluid solids combustion zones shown in FIG. II to generate high pressure process steam from regeneration flue gases, CO rich, and effect the recovery of sulfur oxides as calcium oxide and calcium sulfate. This generated high pressure steam arrangement is utilized in a steam distribution and recovery system which effectively contributes to the thermal efficiency of the combination of processing steps herein described. A common gaseous hydrocarbon product concentration and recovery section of the separate solids contacting steps and represented by FIG. III materially contributes to the operating efficiency of the combination operation.

FIG. IV is an arrangement of apparatus identified as the (MRS) metals removal system unit considered in one aspect as a thermal visbreaker relying on hot fluidizable inert solids for effecting initial contact of a reduced crude containing feed as herein identified with a solid sorbent material to effect removal of metal contaminants and thermal degradation of high boiling carbon forming materials in the feed. In this fluid solids thermal conversion system (MRS) effected at a temperature within the range of 900° to 1050° F. it is desirable to employ a riser contacting zone which permits maintaining the hydrocarbon feed residence time below about 5 seconds and more usually below about 3 seconds and space velocity conditions which will restrict thermal cracking to produce naphtha material and yet provide a thermally visbroken vaporous product of reduced metals and Conradson carbon producing components and a feed thus more suitable for zeolite catalytic cracking in a downstream catalytic cracking-catalyst regeneration system shown in FIG. V. In the arrangement of FIG. IV, provision is made for quenching the thermally produced vaporous product discharged from the riser reactor separator vessel section with main column product fractionator bottoms obtained as herein after discussed with respect to FIG. VI. The quenched vaporous product comprising a demetalized feed material of less than about 100 ppm of (Ni+V) nickel plus vanadium following separation in the MRS main column section of FIG. VI is charged as feed to the RCC riser reactor of FIG. V along with MRS recovered thermal naphtha and water recovered from the RCC main column fractionator overhead drum as more fully discussed below with respect to FIG. VII.

The integrated operation of this invention briefly outlined above is a coalescence of novel operating contributions specifically discussed below which synergistically contribute one to the other to form a novel combinaton of steps for efficiently processing distress hydrocarbon stocks to more desireable gaseous and liquid products in an economically satisfactory manner. The distress stocks which may be processed by the combination operation of this invention include fractions of atmospheric and vacuum distillation such as topped crudes, residual oil, resids reduced crudes and other heavy hydrocarbon materials obtained from coal, oil, shale, tar sands and a combination of such materials. Generally speaking, the oil feeds will all boil above about 600°, 650° or 700° F. and comprise high molecular weight hydrocarbon components not vaporizable at temperatures above about 1000° or 1025° F. Thus depending on feed source and levels of contamination, the initial boiling point of the charge to the MRS unit may be within the range of 700° F. up to 1000° F.

The effects of metal contaminants and Conradson carbon found in the heavy ends of crude oils and other such source materials has been widely discussed in the literature. A recent article entitled "Burst of Advance Enhances Cat Cracking" by D. F. Tolen published in the Annual Refining Report of the *Oil and Gas Journal*, Mar. 30, 1981 is an up to date treatise on the subject and is incorporated herein by reference thereto. The present invention is particularly concerned with increasing the yield of desired product from the bottom or high boiling portion of petroleum crudes. The invention is also concerned with a process which can be utilized to more economically produce premium petroleum products such as gasoline, diesel fuel and gaseous products readily converted to needed useful products in modern day society. More importantly the combination operation of this invention is a thermally attractive energy efficient method for selectively removing and utilizing undesirable high boiling components of crude oils and metal contaminants in the production of more desirable premium fuel. The present invention particularly concentrates on upgrading the "bottom of the barrel" of a crude oil to useful products.

DISCUSSION OF PREFERRED EMBODIMENTS

Referring now to FIG. I by way of example, there is shown a simplified block flow arrangement of the combination process of this invention. In the arrangement of FIG. I a high boiling hydrocarbon feed such as a reduced crude, a residual oil feed boiling above about 650° F. and comprising reduced crude components such a porphyrins, asphaltenes and polycyclic compounds are charged by conduit 2 to a MRS metals removal thermal contacting system 4 wherein the feed is contacted with solid sorbent particulate material having little if any cracking activity under conditions to thermally visbreak and reduce metal contaminants to a more acceptable lower level in conjunction with reducing the feed Conradson carbon value. During this thermal contacting operation with solid sorbent particulate more fully discussed with respect to FIGS. IV and VI, a wet gas product is formed and recovered by conduit 6, a $C_5+$ naphtha product recovered by conduit 8 and a 430° F.+ product material recovered by conduit 10. The $C_5$ plus product material in conduit 8 and the 430° F. plus product material in conduit 10 are charged to an RCC (reduced crude cracking) unit 12 more fully discussed below with respect to FIGS. V and VII. During catalytic cracking conversion of the demetallized feed material obtained from the MRS thermal conversion operation, a wet gas product stream is formed and recovered by conduit 14, a main column overhead liquid is recovered by conduit 16, a 430° to 630° F. product fraction is recovered by conduit 18 and a 630° F. plus unconverted material stream is recovered by conduit 20. The RCC conversion products recovered by conduits 18 and 20 may be used in fuel oil blending operations not shown. On the other hand the 630° F. plus product may be further converted by catalytic cracking either in a separate FCC unit not shown or as recycle to the RCC unit 12. The 430° F.–630° F. product in conduit 18 may also be further refined as desired to meet fuel demands as by cracking, hydrogeneration and other processing steps suitable for the purpose. The RCC main column overhead liquid in conduit 16 is passed to a gas concentration unit 22 discussed below. So also is the wet gas in conduits 6 and 14 blended and passed by conduit 6 to unit 22. A detailed discussion of the gas concentration unit operation is provided below with respect to FIG. III. The operation of the gas concentration unit provides a fuel gas stream withdrawn by conduit 24, which material is then passed to an MEA absorber 26 before being recovered by conduit 28. A gasoline product boiling in the range of $C_5$ hydrocarbons up to about 400° or 430° F. is recovered from unit 22 by conduit 30 and passed to a gasoline treating unit 32 before being recovered by conduit 34. In gasoline treating unit 32 it is contemplated treating the gasoline with a caustic wash and an electrostatic precipitator to remove undesired impurities in a manner known in the industry.

A $C_3/C_4$ product fraction is recovered from unit 22 by conduit 36 and passed to a $C_3/C_4$ treating unit 38. In unit 38, the $C_3/C_4$ fraction is treated to remove sulfur impurities and then caustic washed.

The product of treating unit 38 is passed by conduit 40 to a hydrogeneration unit 42 designed to particularly accomplish hydrogenation of diolefins before being recovered by conduit 44.

Referring now to FIG. IV by way of example there is shown one arrangement of apparatus for effecting thermal contact of the residual oil or reduced crude containing feed with a solid sorbent material to accomplish metals removal and reduce the Conradson carbon producing components of the feed. The contact system of FIG. IV is referred to herein as the MRS system (metals removal system) by thermal visbreaking comprising a riser contact zone for selectively thermally contacting the heavy residual oil feed comprising metal contaminants with a solid sorbent particulate material such as a kaolin solid particulate material of little or no catalytic cracking activity at a temperature within the range of 900° to 1050° F. under space velocity conditions and hydrocarbon feed partial pressure selected to accomplish substantial metals removal in the absence of excessive thermal cracking for the production of thermal naphtha boiling range products. In the specific arrangement of FIG. IV, atomizing water is added by conduit 1 to a reduced crude containing feed introduced by conduit 3 to a riser reactor 5 and above the bottom portion thereof. Steam in conduit 7 and/or admixed with water in conduit 9 obtained from the main column overhead drum discussed below with respect to FIG. 7 is admixed with circulated hot solid particulate at a temperature in the range of 1300° to 1500° F. in the bottom portion of the riser in amounts and under conditions selected to adjust the temperature of the hot solids obtained from regeneration thereof and before contacting the oil feed particuarly selected for charge to the riser. This particular combination of diluents admixed with solids permits establishing a vertical velocity component to the solids before contact with dispersed hydrocarbon feed material in the riser under selected temperature and pressure conditions. A suspension of solid sorbent particulate and atomized feed of low partial pressure in the presence of steam diluent at a temperature below about 1025° F. is recovered from the riser 5 at a velocity providing a hydrocarbon residence time less than 5 seconds and preferably within the range of 0.5 to 4 seconds. The riser 5 is provided with a plurality of vertically spaced apart feed inlet means to accomplish the above change in hydrocarbon residence time. The suspension passed through riser 5 is discharged from the top or open end of the riser and separated so that vaporous hydrocarbons of thermal visbreaking and gasiform diluent material are caused to flow through a plurality of parallel arranged cyclone separators 11 and 13 positioned about the upper open end of the riser contact zone. Hydrocarbon vapors separated from entrained solids by the cyclone separators are collected in a plenum chamber 15 before withdrawal or recovery by conduit 17 at a temperature of about 970° F.

The vaporous material in conduit 17 is quenched in one specific embodiment to a temperature of about 680° F. by admixture with a portion of the main column bottoms product in conduit 19 of the MRS (metals removal system) product recovery section of FIG. VI more fully discussed below. Solid particulate material comprising kaolin particulate in this specific embodiment comprising accumulated metal deposits and carbonaceous material of thermal degradation are collected in a bottom portion of vessel 21 comprising a stripping section 23 to which stripping gas is charged by conduit 25 at a temperature of at least about 400° F. Higher stripping temperatures up to 1050° F. are also contemplated. Stripped solid absorbent particulate material is passed by standpipe 27 provided with a flow control valve to fluid bed of particulate in a bottom portion of a regeneration zone 29. Regeneration gas or combustion supporting gas such as oxygen modified gas or air is charged to a bottom portion of the regeneration zone by conduit 31 through a plenum distribution chamber 33 supporting a plurality of radiating gas distributor pipes 35. Regeneration of the sorbent particulate by burning deposited carbonaceous material is accomplished at a temperature up to about 1500° F. preferably in an oxygen lean or restricted oxygen containing gas restricted atmosphere promoting the formation of a (CO) carbon monoxide rich regeneration flue gas. Combustion product gases and catalyst pass from an upper level 37 of a fluid bed of particulate through a restricted passageway 39 as a suspended mass of particulate in flue gases to an upper enlarged portion of the regeneration vessel where a separation is made between solid particulate and product flue gases by the combination of hindered settling and cyclone separator means. The separated particulate is collected as a fluid bed of material 41 in a annular zone about restricted passageway 39. Flue gas separated from solids pass through a plurality a cyclones 43 positioned about the open upper end of passageway 39 for removal of entrained fines. The CO rich flue gases then pass to plenum chamber 45 for withdrawal therefrom by conduit 47. Further disposition and utilization of the flue gas in conduit 47 is discussed more fully below with respect to FIG. II. Regenerated solid sorbent particulate at an elevated temperature within the range of 1000° to 1500° F. is passed by standpipe 49 to the bottom portion of riser 5 for use as herein proposed. A portion of the hot regenerated sorbent is withdrawn by conduit 51 for passage to a heat exchanger 53 wherein 450 lbs. steam is particularly generated by indirect heat exchange with charged boiler feed water introduced by conduit 55 and steam recovered by conduit 57. The thus partially cooled solid particulate is withdrawn by conduit 59 for passage to a bottom portion of the fluid bed of particulate in a bottom portion of regeneration zone 29 for temperature control of the metals contaminated particulate being regenerated.

FIG. VI is concerned particularly with the product recovery section of the MRS unit for the recovery of different valuable fractions and heat exchange utilization contributing to the overall efficiency of the combination operation. In the arrangement of FIG. VI, the demetallized vapors recovered by conduit 17 following addition of quench fluid substantially immediately upon recovery from plenum 15 is charged to a product fractionating or main column 61 maintained at a bottom temperature of about 590° F. and a top temperature of about 285° F. A gaseous material is withdrawn at a temperature of about 285° F. from the column by conduit 63 for passage through air cooler 65, cooler 67 and thence to drum 69 wherein a separation is made at a temperature sufficiently reduced to recover a gasiform stream by conduit 71 passed to compressor 73 and then by conduit 75 to the gas concentration system of FIG. III. A naphtha fraction is recovered from drum 69 by conduit 77, a portion of which is recovered by conduit 79 for recycle to the riser reactor 5 with the remaining portion thereof being recycled as reflux to column 61 by conduit 81 to an upper portion of the MRS main column 61. A sour water stream is recovered from drum 69 by conduit 83, a portion of which is passed to a sour water stripper not shown with the remaining portion being recycled to the MRS riser reactor as quench fluid introduced by conduit 9. An intermediate boiling range product fraction boiling above naphtha boiling material is withdrawn by conduit 85, a portion of which is recycled to the column as pump around conduit 87, with another portion thereof being passed through a plurality of heat exchangers 89 to develop low pressure 150 psig stream before being recycled to the main column by conduit 91. Another portion of the material withdrawn by conduit 85 is passed by conduit 93 to heat exchanger 95 and received therefrom by conduit 97 for use as a portion of the demetallized charge to the RCC unit discussed below with respect to FIG. V. On the other hand, all or a portion of the material in conduit 97 may be passed by conduit 99 to heat exchanger 101 and air cooler 103 before being passed to storage as a demetallized liquid product thereafter available for further treatment or use as desired.

A bottom fraction withdrawn from column 61 by conduit 105 at a temperature of about 590° F. is passed in parallel flow arrangement partially through a high pressure stream generating heat exchanger 107 and partially through a crude oil feed heat exchanger 109 before being combined again as a single temperature reduced stream for passage through heat exchanger 111 provided for generating 150 psig steam indirectly. A portion of the bottoms fraction thus cooled is passed by conduit 113 directly to the main column 61. A portion of this material is diverted by conduit 19 for use as quench fluid of the MRS vapors as discussed above. Still another portion of the cooled material withdrawn from exchanger 111 is passed by conduit 115 to a slurry settler drum 117. In slurry settler drum 117 a separation is made which permits withdrawal of a demetallized material by conduit 119 which is further cooled in heat exchanger 121 before admixture with material in conduit 93 charged to heat exchanger 95. Heat exchanger 121 is relied upon to produce 150 psig steam with heat exchanger 95 providing preheat to boiler feed water for producing 450 pound steam. Provision is made for charging the MRS feed (reduced crude containing feed) to a charge drum 123 by conduit 125 from which a bottoms fraction is withdrawn by conduit 127 and a low boiling portion of the charge may be separated and withdrawn by conduit 129 in a particular embodiment which material is introduced to a lower portion of the main column 61 but above the MRS quenched product material in conduit 17. The high boiling hydrocarbon charge recovered from drum 123 by conduit 127 is passed directly to the MRS riser reactor for demetallization as above described or it may be diverted at least in part through the slurry settler 117 and withdrawn from the bottom thereof by conduit 131 before being charged as feed to the MRS riser reactor with solid particulate recovered from slurry settler 117. Referring now to FIG. V there is shown an arrangement of vessels with interconnecting conduits comprising an RCC riser reactor-regenerator system relied upon to process the demetallized feed materials obtained from the MRS thermal demetallizing unit. As mentioned above, the residual metals in the RCC feed on the basis of (Ni+V) nickel plus vanadium charged to the RCC riser reactor will be considerably reduced by the MRS solid contacting unit and usually will be less than about 100 ppm Ni+V. The operation of the RCC system is similar in many respects to an (RCC) fluid catalyst cracking system but is more critically and selectively controlled with respect to catalyst regeneration and catalyst use in order to process thermal converted high boiling residual oils or reduced crudes which have been partially demetallized and decoked as herein provided. Operation of the RCC unit is critical with respect to heat balance and feed conversion selectivity since relatively substantial amounts of carbonaceous deposits are laid down on the catalyst depending on feed charged, metal deposits accumulated on the circulated catalyst and over cracking of charged feed is potentially eminent so that product selectivity may be undesirable, altered when the balance of the operation is permitted to vary from a relatively restricted range of operating conditions into less than an efficient and economic operation. Thus it is desirable to restrict the operation of a two stage regeneration operation of the RCC system so as to restrain the amount of heat transferred to the RCC riser cracking zone by the catalyst and yet reduce residual coke on regenerated catalyst to a desired low level. The catalyst regeneration operation is considered unique in generating CO rich flue gas subsequently used to advantage in the process to generate high pressure steam in conjunction with providing a mass of active zeolite containing catalyst particles of restricted temperature and residual coke on the catalyst particles. More importantly however is the identification of operating conditions utilized in the hydrocarbon conversion riser reactor which permits one to process thermally treated heavy crudes partially demetallized and decoked as herein identified under conditions particularly increasing the yield of desired liquid fuel products comprising gasoline and gasiform materials readily converted to useful fuel products including gasoline boiling range product materials such as by alkylation, isomerization, polymerization or a combination thereof. The hydrocarbon conversion riser operations of the MRS and the RCC system are relatively high velocity operations as herein porvided. In the RCC system the temperature of the conversion product vapors is restricted to within the range of 950° F. to about 1050° F. and more particularly restricted not to exceed about 1000° F. when charging the demetallized feed of MRS processing herein described to the riser at a temperature of about 400° F. The use of water injection and steam dispersion is relied upon in substantial measure for temperature control, feed atomized dispersion and in achieving a high velocity suspension of catalyst particles and hydrocarbon feed in the riser cracking reaction time frame of hydrocarbons in contact with catalyst particles in the riser less than about 4 seconds and more usually less than about 3 seconds. Thus it is important to achieve rapid dispersed contact of feed with catalyst particles and separation of hydrovapors from catalyst substantially immediately upon discharge from the riser reactor conversion zone. In order to accomplish the above identified selective operation the riser reactor is designed to achieve high velocity (about 180 ft./second) mixing of hot catalyst particles with fluidizing gaseous material and with charged partially demetallized high boiling feed material in a lower restricted diameter portion of the riser reactor section and thereafter decreasing the velocity of the suspension to a discharge velocity of about 85 or 86 feet per second adjacent the upper discharge end of the riser. This combination and alteration of the suspension velocity is accomplished particularly by gradually increasing the diameter of the riser in an upper transition section thereof. In a particularly preferred arrangement the initially formed suspension is at a velocity of about 180 feet per second and the velocity of the suspension discharged from the open upper end of the riser reactor is about 86 feet per second after passing through an expanding transition section and the discharge temperature is maintained below about 1025° F. but above about 975° F. in a specific embodiment. In a specific arrangement, the riser reactor of FIG. V is about 198 ft. tall of which the top 25 feet thereof is about 63 inches in diameter and connected by a 7 foot transition section to a 40 inch diameter tube comprising the lower section of the riser reactor. FIG. V shows introducing a mixture of the demetallized feed, conduit 172, obtained from the MRS unit, MRS naphtha in conduit 79 and water in conduit 118 obtained from the main column overhead drum to a bottom or upper portion of riser reactor 50 as desired. Steam may be charged separately to the bottom of the riser and with demetallized feed as charged to assist with atomized and vaporized dispersion of the heavy oil feed in contact with the regenerated hot catalyst particles charged to the bottom portion of the riser by conduit 52. It is thus contemplated forming a high velocity suspension of steam and catalyst with or without charged naphtha in a bottom portion of the riser and prior to charging the demetallized thermally converted oil feed with additional quantities of water and/or steam. Thus it is contemplated charging the oil feed admixed with atomizing diluent such as steam and/or naphtha through a plurality of oil feed atomizing feed devices not shown to achieve more intimate contact of the high boiling feed with hot regenerated fluidizable catalyst particles and form a suitable upflowing suspension therewith undergoing conversion within the time and temperature conversion frame desired. The concentration of catalyst particles in the upflowing suspension is selected to be within the range of about 2 to 10 lbs. per cubic ft. depending upon the composition of the feed charged for catalytic conversion thereof.

Following traverse of riser 50 the suspension is discharged from the top open end of the riser and rapidly separated by passing gasiform product material comprising hydrocarbon vapors with some entrained catalyst particles through a plurality of parallel arranged cyclone separators 54 generally comprising one stage of cyclone separator positioned about the upper end of the riser. However, at least two cyclone separators in series may also be employed. Separated product vapors or gasiform material comprising hydrocarbon conversion products are collected in plenum chamber 56 and withdrawn therefrom by conduit 58 communicating with a RCC product recovery section represented by FIG. VII and discussed below. Catalyst particles separated from vaporous products of hydrocarbon conversion are collected and passed downwardly through a stripping zone 60 countercurrent to stripping gas such as steam introduced by conduit 62. The temperature of the RCC stripping operation is generally maintained within the range of 900° F. to 1050° F. The stripped catalyst is passed by a standpipe or conduit 64 to a bed of catalyst 66 in the first stage of catalyst regeneration affected in the upper portion of a two stage catalyst regeneration vessel 68.

Regeneration vessel 68 is unique in that the upper portion thereof is of larger diameter than a bottom portion and separated from one another by a centrally located air distributor plenum chamber 70 supported by an annular baffle 72 provided with flue gas flow through passageway 74. A plurality of radiating arm means 76 are provided with plenum 70 for introducing additional regeneration gas to a lower portion of catalyst bed 66. Regenerator air in a specific embodiment amounting to about 75% of that required to achieve desired carbonaceous material removal by burning and regeneration of the catalyst is introduced to plenum chamber 70 by conduit 78. The regeneration gas such as air may be preheated by means not shown to a desired elevated temperature of about 300° F. The catalyst introduced to bed 66 by conduit 64 comprises carbonaceous deposits of the riser hydrocarbon conversion operation and contain some hydrogen. In this first stage of catalyst regeneration operation, the regeneration temperature is kept to a low value in the range of about 1200° F. up to about 1300° F. under combustion supporting conditions of carbonaceous deposits sufficient to effect partial removal of carbonaceous deposits and produce a CO rich flue gas. CO rich flue gases comprising $CO_2$, sulfur oxides, nitrogen and water vapor pass through a combination of parallel arranged cyclone separators and which may comprise two on series and represented by cyclones 80 wherein entrained catalyst particles are separated from flue gas and returned by the cyclone dipleg to the catalyst bed 66. Flue gas separated from catalyst particles is passed to a plenum chamber 82 for withdrawal therefrom by conduit 84 as a CO rich flue gas for use as discussed below.

The partially regenerated catalyst of bed 66 is passed to a second stage of catalyst regeneration below the first stage through an external standpipe 86 provided with a catalyst cooler 88 wherein high pressure 450 pound steam is generated. The catalyst partially cooled in steam boiler 88 and only partially regenerated is then passed by conduit 90 to a fluid bed of catalyst 92 in the lower portion of the regeneration vessel 68 and comprising the second stage of catalyst regeneration. Standpipe 94 is also provided as a secondary external standpipe for transfer of catalyst from bed 66 to bed 92. However, standpipe 86 is the primary route of catalyst transfer from bed 66 to bed 92. The use of these transfer standpipes is to transfer partially regenerated catalyst and maintain temperature control in the lower regeneration stage for residual carbon burn below at a temperature within the range of 1325° up to about 1500° F.

Regeneration of catalyst in bed 92 is effected at a temperature generally higher than that of bed 66 and more usually is maintained at a temperature within the range of 1350° up to about 1400° F. and in the presence of an oxygen containing gas sufficient to achieve substantial burning of residual coke on the partially regenerated catalyst obtained from bed 66. In one specific embodiment the amount of air or oxygen modified gas employed in the second stage of catalyst regeneration introduced by conduit 96 beneath a distribution grid 98 is only about 25% of that required to accomplish desired catalyst regeneration and produce a CO rich flue gas for passage to and recovery or at least in part from the first stage of regeneration. That is, all of the flue gas from the second stage of regeneration pass through openings 74 in baffle member 72 separating the upper regenerator from the lower regenerator. Thus the hotter flue gases of the second stage operation comprising CO, $CO_2$ and any unreacted oxygen containing gas pass into the bottom portion of bed 66 thereby contributing heat to catalyst bed 66 whereby initiation of the combustion of carbonaceous deposits is implemented. Regenerated catalyst of relatively low residual coke below about 0.25 weight precent and at a temperature within the range of 1300° to 1500° F. is withdrawn from catalyst bed 92 for passage by conduit (standpipe) 52 to a lower bottom portion of riser 50 and reuse as herein before discussed.

The product recovery section of the RCC unit is shown in FIG. VII. Referring now to FIG. VII, vaporous hydrocarbon products and diluent materials of the RCC reactor withdrawn by conduit 58 (FIG. VI) are passed to a bottom portion of main column 100 for separation by fractionation as hereinafter briefly discussed. A vaporous or gasiform material comprising hydrocarbon vapors and diluent is withdrawn from the top of column 100 by conduit 102 for passage through air cooler 104, and heat exchanger 106 to drum 108. In drum 108 maintained at a temperature sufficient to recover 400° F. material by conduit 110, a separation is made which permits the recovery of equilibrium hydrocarbon vapors comprising 400° F. minus material by conduit 110, a gasoline boiling range product material is also recovered by conduit 112, a portion of which is recycled as reflux to column 100 by conduit 114 and the remaining portion being passed by conduit 116 to a primary absorber column of the RCC gas concentration section of FIG. III discussed below. Sour water comprising sulfur compounds is recovered from drum 108 by conduit 118 for distribution to a sour water stripper not shown or as recycled by conduit 118 to the RCC riser reactor as discussed above with respect to FIG. V. A light cycle oil (LCO) recovered in the system of FIG. III is charged by conduit 120 to an upper portion of column 100 below about tray 12, but above a grid packing section shown. A light cycle oil is withdrawn from column 100 above tray 13 by conduit 122. A portion of this withdrawn LCO may be recycled directly to the column with the major portion thereof being passed directly to the system of FIG. III discussed below. A portion of the LCO withdrawn by conduit 122 is passed by conduit 124 to a LCO stripper 126. Material stripped from the light cycle oil with steam in zone 126 is returned to the main column by conduit 128. Stripped LCO is withdrawn from stripper 126 by conduit 130 for passage through heat exchanger 132, air cooler 134 and cooler 136 before passage to storage. A portion of this material may be used as flushing fluid in pumps, instruments and other process equipment of the combination process.

A heavy cycle oil (HCO) is recovered from column 100 by conduit 138 for passage to a heat exchanger 140 in the system of FIG. III whereby cooling of the HCO is accomplished before recycle thereof to an upper portion of the main column by conduit 142. A bottoms fraction is recovered from the main column by conduit 144 for passage to heat exchange means 146 associated with the debutanizer tower of FIG. III disclosed below. This material following cooling thereof by heat exchange means 146 is recycled to the main column of FIG. VII by conduit 148. Provision is also made for passing a portion of the high boiling material in conduit 144 through a steam boiler 150 by conduit 152 and heat exchange cooler 154. The high boiling material thus cooled is combined with slurry material in conduit 148 for recycle to the main column below about tray 20 to maintain the temperature in a bottom portion of the column about 650° F. A portion of the high boiling material in conduit 144 may also be passed by conduit 156 to slurry settler 158 from which a clarified oil is recovered by conduit 160 and cooled by heat exchanger 162 and 164 before being passed to storage for other use as desired. The clarified oil thus recovered is suitable for use in heavy fuel oil blending operations or it may recycled to the RCC riser for further conversion thereof.

The reduced crude containing feed demetallized by the MRS system of FIGS. IV and VI and recovered by conduit 97 is passed to charge drum 168 wherein depending on temperature conditions maintained, a separation may or may not be made before passing the RCC charge material all or in part thereof to the slurry settler 158 by conduit 170. A portion of the RCC charge material may also be passed through exchanger 154 before being combined with the slurry settler bottoms and passage as feed to the RCC riser reactor by conduit 172. Low boiling component material in the charge passed to drum 168 may be separated and passed overhead by conduit 174 to the main column 100. On the other hand it is contemplated recovering a heavy cycle oil (HCO) type material from the main column for admixture in drum 168 by conduit 174 with the charge material introduced by conduit 97.

One of the more important aspects of the combination operation of this invention with respect to processing efficiency and energy conservation resides in the gas concentration section represented by FIG. III. In this arrangement of processing steps, the equilibrium hydrocarbon vaporous material recovered from the RCC main column 100 overhead drum 108 by conduit 110 is charged to a compressor suction drum at a temperature of about 100° F. and a pressure of about 5 psig provided with a demister pad in an upper portion thereof. In normal operation, no liquid product is separated in low pressure drum 176 so that the total hydrocarbon vapor stream charged to drum 176 and comprising $C_2$ plus material and gasoline component material boiling up to about 400° F. is removed overhead by conduit 178 for passage to a first stage of compression 180 to raise the pressure of this equilibrium stream up to about 75 psig. The compressed material in conduit 182 is partially cooled by the direct addition of water thereto followed by further cooling in heat exchanger 184 before discharge in drum 186. A separation is made in drum 186 to provide a liquid stream withdrawn by conduit 188 and a vaporous stream withdrawn by conduit 190. The vaporous material is further compressed in compressor 192 and recovered therefrom at an elevated pressure by conduit 194 for passage to drum 200 downstream thereof at a pressure in the range of about 210–215 psig and a temperature of about 60° F. The compressed vaporous material in conduit 194 is mixed with liquid in conduit 188 provided with a pump not shown for passage to air cooler 196 and heat exchanger 198 before entering drum 200 briefly referred to above. Vaporous material from the MRS wet gas compressor in conduit 75 is added to vaporous material in conduit 194 before passing up to air cooler 196.

In drum 200 an equilibrium separation is made at a temperature of about 60° F. and pressure of about 215 psig to recover a hydrocarbon vaporous material boiling below 400° F. withdrawn by conduit 202 from a liquid hydrocarbon product recovered by conduit 204 and water recovered by conduit 206. The vaporous material in conduit 202 is passed to the lower bottom portion of a primary absorber column 208. Liquid material recovered from the main column 100 overhead drum 108 by conduit 116 (FIG. VII) is charged to an upper portion of absorber column 208. A primary function of absorber column 208 maintained at a top temperature of 114° F. and a bottom temperature of 111° F. is to effect a separation of $C_3+$ material from lower boiling gaseous material comprising ethane withdrawn by conduit 226. To assist in this separation effort a first pump around stream is withdrawn from an upper portion of the absorber column above tray 13 by conduit 210, cooled in cooler or heat exchanger 212 and returned to the column by conduit 214. A second pump around stream is withdrawn about tray 27 by conduit 216, cooled in cooler or heat exchanger 218 and returned by conduit 220 to the column above tray 27. The efficiency of absorber column 208 is further improved by charging gasoline product material recovered as herein after discussed by conduit 222 to an upper top portion of the tower 208. This method of operating the primary absorber has been found to considerably improve the separation and recovery of $C_2$ and lower boiling materials from more desirable higher boiling material produced and separated in the process. The absorber bottoms is recovered by conduit 224 and passed to air cooler 196 along with material in conduit 194 and that withdrawn from the top of stripper 242. The gaseous overhead material of column 208 is withdrawn by conduit 226 for passage to a sponge oil absorber tower 228. A light cycle oil (LCO) product recovered from the main column fractionator FIG. VII by conduit 112 and cooled as hereinafter discussed is employed as sponge oil in column 228 to effect recovery of $C_3+$ constituents from $C_2$ components in the gaseous stream of conduit 226 comprising ethane and hydrogen. The $C_2$ product is withdrawn by conduit 230. The sponge oil (LCO) in conduit 112 is passed through cooler 232 heat exchanger 234 and cooler 236 before discharge in an upper portion of column 228. The sponge oil enriched with $C_3+$ components is withdrawn by conduit 238 for passage through heat exchanger 234 and recovery therefrom by conduit 240 and return to the main column by conduit 120.

The liquid hydrocarbon product recovered by conduit 204 from drum 200 is pumped for discharge in the upper top portion of a stripper column 242. A 400° F. minus material charged to stripper 242 is withdrawn from the bottom of stripper 242 by conduit 248 for passage to a debutanizer tower 250. Debutanizer tower 250 is maintained at a top temperature of 143° F. and a bottom temperature of 394° F. and pressure conditions promoting the separation of $C_3+$ material charged by conduit 248 to be separated into a $C_3-C_4$ rich fraction removed from the top of the tower by conduit 252 and passage through air cooler 254, cooler 256 to drum 258. Separated $C_3-C_4$ product material is recovered from drum 258 for further treating as desired such as alkylation, polymerization and izomerization with a portion thereof recycled to an upper portion of tower 250, as reflux. A $C_5+$ gasoline fraction is recovered from the bottom of tower 250 by conduit 260. A portion of this $C_5+$ gasoline fraction is passed to heat exchanger 246, then to air cooler 262, heat exchanger 264 and recovery therefrom by conduit 266. A portion of this recovered gasoline fraction is recycled by conduit 222 to tower 208 as discussed above to improve separation and recovery between ethane and lower boiling material from higher boiling $C_3+$ hydrocarbons. Another portion of the $C_5+$ gasoline recovered by conduit 260 is separated into parallel streams for passage through exchangers 140 and 146 to raise the temperature thereof before recycle to a lower portion of column 250.

An important aspect of the overall processing combination of this invention is concerned with the generation of CO rich flue gases, combination of the CO rich flue to generate high and low pressure steam used in the process and distributed as briefly discussed herein, thus contributing to significant savings in energy. FIG. II is particularly directed to an arrangement and utilization of CO rich flue gas obtained from the regenerator vessel of the MRS unit and the RCC unit discussed in more detail above. A further significant aspect of the operation is concerned with the recovery of sulfur oxides found in the regeneration flue gas so that cooled flue gas may be vented directly to the atmosphere without harmful effect. In the arrangement of FIG. II, CO rich flue gas from the RCC regenerator of FIG. V withdrawn by conduit 84 is charged in part to CO boiler 270 and by conduit 272 to CO boiler 274. Regeneration flue gas recovered from the MRS regenerator by conduit 47 is charged in part to CO boiler 274 and by conduit 276 to CO boiler 270. This parallel flow arrangement of CO rich flue gas to the parallel arranged CO boilers in admixture with added combustion supporting gas permits operating one without the other during shut down for any particular reason. The CO boilers contemplated for use comprise directly contacting limestone particulate with combustion flue gas following combustion of CO with added air and in indirect heat exchange with boiler feed water charged to a given CO boiler arrangement for generation of high pressure 450 lb. steam recovered therefrom by means provided. In this operating arrangement calcium oxide and calcium sulfate are formed during direct contact between a fluid bed of limestone particulate and combustion product gases and separately recovered so that the flue gas combustion products separated from sulfur contaminant may be discharged directly to the atmosphere through a stack 288 provided. The fluidized limestone thus converted in CO boiler 270 and 274 is recovered by conduit means 278 and by conduit means 280 from CO boiler 274. Combustion products of CO boiler 270 are passed by conduit 282 to bag house 284 for recovery of fines therefrom before passing by conduit 286 to stack 288 and release to the atmosphere.

Combustion product gases of CO boiler 274 are passed by conduit 290 to bag house 292 for removal of entrained fines before passage by conduit 294 to stack 288 either separately or admixed with gases in conduit 286. High pressure steam is recovered from zone 270 by conduit 296 and from zone 274 by conduit 298.

An important aspect of the combination operation of this invention is concerned with the utilization of generated steam by the process and heat exchange arrangement provided to accomplish transfer, utilization and recovery of heat energy by the combination operation. That is the high pressure steam generated by CO boiler arrangement is relied upon to drive turbines for the air blowers for the MRS and RCC regenerators above discussed, there being two such air blower arrangements for the MRS regenerator because of the regeneration air requirements thereof. This generated high pressure steam is also utilized to drive air blower providing combustion air to the CO boilers, as well as to drive turbines for the RCC wet gas compressors 180 and 192 and the MRS wet gas compressor 73. The RCC slurry steam generator 150 provides 450 lbs. steam as does the MRS steam drum 107. This generated high pressure steam is utilized to drive turbines for the MRS charge pump (not shown), the RCC charge pump (not shown), the RCC slurry pumps (not shown) and a boiler feed water pump (not shown). The RCC slurry steam generator 154 is relied upon to generate 150 pound steam as does the MRS steam drum 111. This 150 pound steam is supplemented by the recovery of 150 pound steam from the 450 pound blow down of steam generators. The 150 pound (psi) steam thus generated is used to drive lube oil pumps (not shown) and is also used as RCC reactor stripping steam, LCO stripper steam above discussed and for condenser vacuum jets required in the process but not discussed. Condensate recovered from the above briefly discussed steam utilization is charged as boiler feed water to the various heat exchangers identified in the drawing above specifically discussed.

Another important aspect of the combination operation of this invention above discussed is concerned with the severity of thermal conversion relied upon in the MRS operation employing relatively inert fluidizable solids to provide a suitable feed material to be converted with a crystalline zeolite containing catalyst in the downstream RCC catalytic conversion operation. That is, the operating techniques of this combination of operations are concerned with effecting the catalytic conversion of a thermally prepared feed material comprising a relatively high level of metal contaminants up to about 100 ppm Ni+V with cracking catalyst comprising catalytically active crystalline zeolite of relatively large pore dimensions as provided by faujasite type crystalline zeolites in admixture with a sorbent matrix material and said catalyst comprising a higher contaminating metals loading than previously thought usable in similar cracking operations. In this operating combination, tailoring of the operating conditions employed in the MRS thermal visbreaking operation and feed preparation unit are made to provide a thermally processed high boiling portion of crude oil as feed for a downstream catalytic conversion step and comprising up to about 100 ppm Ni+V. This interrelated tailoring of operating conditions for feed preparation and utilization thereof are adjusted dependent upon the composition of the high boiling feed to be processed, its initial boiling point and the level of metal contaminants and Conradson carbon producing components upon pyrolysis. In this connection, whatever high boiling portion of a topped crude is to be upgraded as herein provided thermal preparation of the feed will be accomplished under conditions permitting up to 100 ppm Ni+V remaining in the feed to be charged to the RCC catalytic cracking operation. It is also desirable within this processing arrangement to limit the production of thermally produced naphtha even though such thermal naphtha can be and is intended to be upgraded in the zeolite cracking operation along with thermally demetallized high boiling feed charged thereto as above discussed.

The important aspects of the combination operation of this invention are many fold as provided by the claims hereinafter presented. That is it has now been found that the thermal conversion or visbreaking operation effected in the absence of added molecular hydrogen provides a variety of operating parameters in that the inert solid sorbent particulate material may comprise a high loading of metal contaminants to provide a residual oil feed or high boiling portions thereof comprising up to 100 ppm Ni+V for processing in a downstream zeolite catalyst cracking operation. In this connection and operating environment the downstream zeolite cracking operation may circulate a catalyst composition comprising at least 3000 ppm Ni+V metal contaminants. The efficiency of the separate operations are of a high order of magnitude and synergistically related by the recovery of high pressure steam from the combined flue gases of each regeneration operation and utilization thereof to some considerable advantage in providing energy requirements of the combination operation. More importantly is the economic efficiency attached to the recovery section of FIG. III referred to as the gas concentration section for processing the wet gas streams recovered from each cracking operation in conjunction with separating the main column overhead accumulated liquid of the RCC product recovery section of FIG. VII. In addition to the above broadly stated advantages of the combination operation herein described, the thermal visbreaking of metals containing feed material is accomplished in a riser conversion zone provided with a plurality of vertically spaced apart feed inlet means to achieve a hydrocarbon residence time within the riser of either one of 0.5 seconds, 1.2 seconds and 1.5 seconds when passing a suspension of solids in gasflow material through the riser at a velocity of 100 feet per second. On the other hand the riser reactor provided for the zeolite catalyst conversion operation wherein the circulated catalyst comprises a level of metal contaminants in excess of 3000 ppm Ni+V, greater than 5000 ppm Ni+V may even comprise as high as 10,000 ppm Ni equivalent, relies upon a high velocity contact system of riser reactor permitting the use of suspension velocities up to as high as 180 or 200 feet per second which velocity is thereafter reduced in an expanded upper section of the riser to permit a suspension discharge velocity of not more than about 85 or 86 feet per second. In this operating environment of the zeolite catalyst cracking step, the hydrocarbon residence time in the presence of substantial amounts of diluent such as steam is restricted not to exceed about 4 seconds and more usually is retained within the range of 0.5 to 2 or 3 seconds.

It is thus evident from the discussion above presented that the combination operation of this invention is economically attractive since it permits the use of solid particulate of fluidizable particle size both catalytic and non catalytic under conditions of high metals loading thereby reducing solids inventory replacement. Of particular interest is the finding that such solid particulate can be used to advantage for preparing and processing high boiling residual portions of crude oils comprising up to 100 ppm Ni+V metal contaminants to more desirable liquid fuel and lower boiling products.

Having thus generally described the combination operation of the present invention and discussed specific embodiments in support thereof, it is to be understood that no undue restrictions are to be imposed by reason thereof except as provided by the following claims.

We claim:

1. A method for removing sulfur oxides from CO-rich flue gas product of regeneration obtained by burning hydrocarbonaceous deposits of thermal and catalytic conversion which comprises combusting a CO rich flue gas comprising sulfur oxides in a CO boiler zone comprising boiler feed water heat exchange zones dispersed in a fluid bed of limestone particles for removing $SO_2$ from CO combustion products during indirect heat exchange with the boiler feed water in said heat exchange zones to produce high pressure steam, and separately recovering generated high pressure steam and cooled products of CO combustion separated from sulfur oxides from the CO boiler zone.

2. The method of claim 1 wherein the cooled products of CO combustion are separated from entrained particulate in a downstream zone separate from the CO boiler zone before discharge thereof to the atmosphere.

3. The method of claim 1 wherein the generated high pressure steam is employed to drive air compressors.

4. The method of claim 1 wherein a portion of the generated steam is relied upon to drive an air blower providing combustion air for combusting CO rich flue gas in said CO boiler zone.

5. The method of claim 1 wherein there are two CO combustion-$SO_2$ removal zones comprising fluidized limestone particles in parallel arrangement for processing a mixture of CO-rich flue gases obtained from each of the regeneration units of a residual oil metal removal zone in sequential combination with a heavy oil catalytic cracking regeneration operation.

6. The method of claim 1 wherein the removal of $SO_2$ from CO combustion products by the fluidized limestone particulate material forms calcium oxide and calcium sulfate which is periodically removed from said CO boiler combustion zone.

7. The method of claim 1 wherein the generated high pressure steam is relied upon to drive turbines for air blowers.

8. In a combination process for upgrading high boiling residual oils such as a reduced crude by initially contacting with relatively inert fluid solids to partially remove metal contaminants and Conradson carbon producing components from the residual oil feed and thereafter effecting catalytic cracking of the partially demetallized and decarbonized residual oil feed whereby carbonaceous deposits comprising sulfur compounds are deposited on the inert fluid solids and catalyst particles, effecting removal of the deposited carbonaceous material in temperature controlled oxidizing environment from said inert solids and catalyst particles to produce combustion product flue gases comprising carbon monoxide and sulfur oxides, the improved method of removing sulfur oxides from said flue gases comprising carbon monoxide and generate steam which comprises:

A. combusting CO containing flue gases comprising sulfur oxides in a CO boiler combustion zone comprising a fluid bed of limestone particles about indirect heat exchange zones therein comprising charged boiler feed water to form steam, B. said CO combustion products comprising sulfur oxides contacting said fluid bed of limestone particles during indirect steam generation thereby forming sulfates with said fluid particles of limestone, and C. recovering CO combustion products separated from sulfur oxides from said CO boiler zone comprising a fluid bed of limestone.

9. The process of claim 8 wherein there are two separate CO combustion zones comprising a fluid particle bed of limestone about indirect steam generating means therein and in parallel flow arrangement for combusting CO containing flue gases passed thereto and CO-rich flue gases obtained from separate thermal and catalytic regeneration operations are passed separately and/or together to one or more of said parallel arranged CO combustion zones.

* * * * *